United States Patent

Hehmann

Patent Number: 5,818,994
Date of Patent: Oct. 6, 1998

[54] DEVICE FOR THE UNADJUSTED COUPLING OF A NUMBER OF OPTICAL WAVEGUIDES TO A LASER ARRAY

[75] Inventor: Jörg Hehmann, Stuttgart, Germany

[73] Assignee: Alcatel N.V., Amsterdam, Netherlands

[21] Appl. No.: 715,791

[22] Filed: Sep. 19, 1996

Related U.S. Application Data

[63] Continuation of Ser. No. 261,842, Jun. 16, 1994, abandoned.

[30] Foreign Application Priority Data

Jun. 18, 1993 [DE] Germany .................. 43 20 194.6

[51] Int. Cl.⁶ ............................................. G02B 6/42
[52] U.S. Cl. ...................... 385/89; 385/88; 385/83; 385/52
[58] Field of Search ................. 385/89, 88, 83, 385/52, 49

[56] References Cited

U.S. PATENT DOCUMENTS

| | | | |
|---|---|---|---|
| 4,802,727 | 2/1989 | Stanley | 385/89 |
| 4,812,002 | 3/1989 | Kato et al. | |
| 5,046,809 | 9/1991 | Stein | 385/49 |
| 5,121,457 | 6/1992 | Foley et al. | 385/89 |
| 5,179,609 | 1/1993 | Blonder et al. | 385/89 |
| 5,182,782 | 1/1993 | Tabasky et al. | 385/89 |
| 5,243,673 | 9/1993 | Johnson et al. | 385/55 |
| 5,259,054 | 11/1993 | Benzoni et al. | 385/89 |
| 5,351,331 | 9/1994 | Chun et al. | 385/89 |
| 5,412,748 | 5/1995 | Furuyama et al. | 385/92 |

FOREIGN PATENT DOCUMENTS

| | | |
|---|---|---|
| 0331334 | 9/1989 | European Pat. Off. . |
| 0466134 | 1/1992 | European Pat. Off. . |
| 0529947 | 3/1993 | European Pat. Off. . |

*Primary Examiner*—Rodney B. Bovernick
*Assistant Examiner*—Yisun Song
*Attorney, Agent, or Firm*—Ware, Fressola, Van Der Sluys & Adolphson LLP

[57] ABSTRACT

A device for coupling optical fibers to a laser array comprises a flat plate (1) with a number of V-grooves (7) and a cover (2) with a number of V-shaped grooves (8), the plate (1) and the cover (2) being fitted and adjusted to each other in such a way that the grooves (7, 8) form channels with a rhombic cross section. In these channels of such a device, pointed optical waveguides (4) may be pushed to a stop (9, 10), and may then be automatically adjusted to a laser array (3) that may be arranged on the plate (1) or cover.

3 Claims, 2 Drawing Sheets

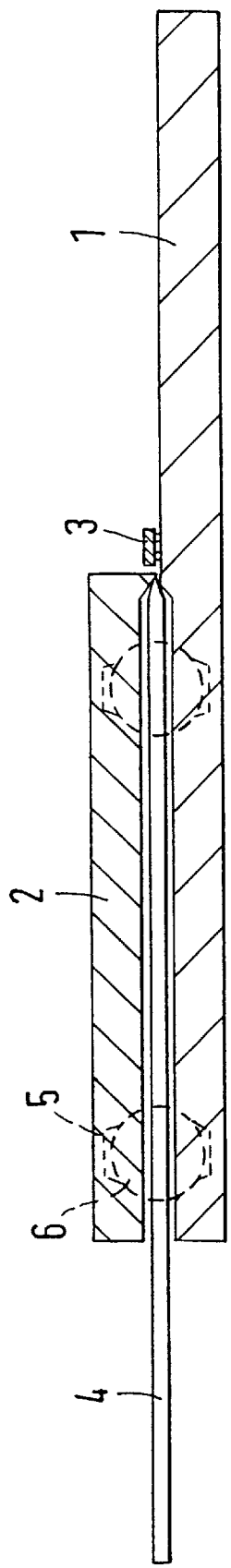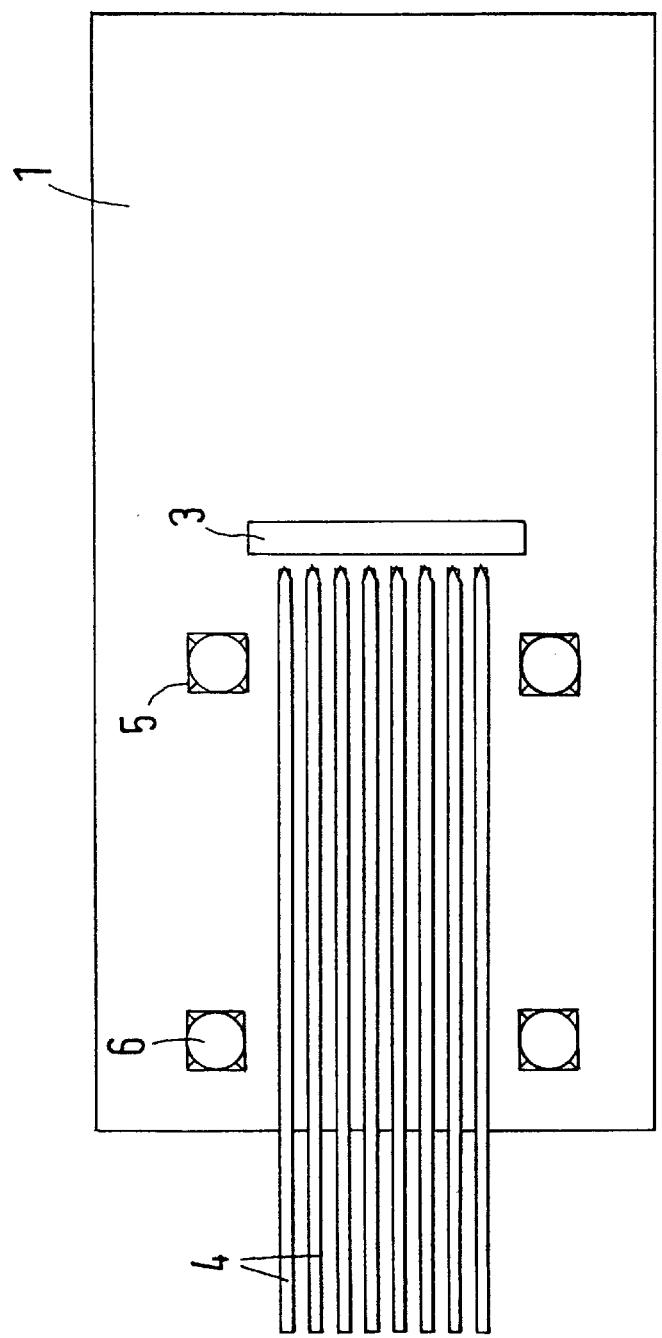

DEVICE FOR THE UNADJUSTED COUPLING OF A NUMBER OF OPTICAL WAVEGUIDES TO A LASER ARRAY

This application is a continuation of application Ser. No. 08/261,842 filed on Jun. 16, 1994 now abandoned.

TECHNICAL FIELD

The invention concerns a device for precisely coupling optical waveguides to a laser array.

BACKGROUND OF THE INVENTION

In presently used methods for coupling optical waveguides or fibers to a laser array, the end of each optical waveguide is individually adjusted to the laser array. This is achieved by placing the optical waveguide in the V-shaped groove of a carrier, which precisely defines the horizontal and vertical position of the optical waveguide. The axial position of the optical waveguide in the groove is adjusted by shifting its end in the direction of the laser array. This takes place with the aid of a microscope, which helps to check whether the end of the optical waveguide has reached the intended final position.

The known method is very costly, especially if a number of optical waveguides are to be coupled to a laser array.

DISCLOSURE OF INVENTION

The technical problem on which the invention is based consists therefore in creating a device that simplifies coupling a number of optical waveguides to a laser array.

This technical problem is solved, according to the present invention, by a flat plate with a number of V-grooves and a flat cover with the same number of V-grooves, which are arranged in the plate and the cover in such a way, that they form rhombic channels after they have been fitted together, wherein the ends of the grooves facing the laser array are equipped with a stop, and the plate and cover are equipped with means for precisely adjusting them in relation to each other.

In further accord with the present invention, the positioning means comprises at least three conical-frustum-shaped depressions formed in the substrate and cover and each containing a ball. The balls may be made of glass.

In still further accord with the present invention, the substrate and cover are made of silicon and the grooves and depressions are formed by anisotropic etching.

The device according to the invention effectively simplifies the coupling of a number of optical waveguides to a laser array. All the prerequisites for precisely coupling the optical waveguides to the laser array have been fulfilled after the device is assembled and the laser array has been attached thereto. It is then only necessary to push the ends of the optical waveguides, which have been ground to a point, to the stop in the rhombic channels and affix them there. Adjustment of the individual optical waveguides is no longer required.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 1 is a longitudinal section through a configuration example of the device according to the invention;

FIG. 2 is a top view of the device according to FIG. 1, after the cover has been removed;

BEST MODE FOR CARRYING OUT THE INVENTION

Figure 3:
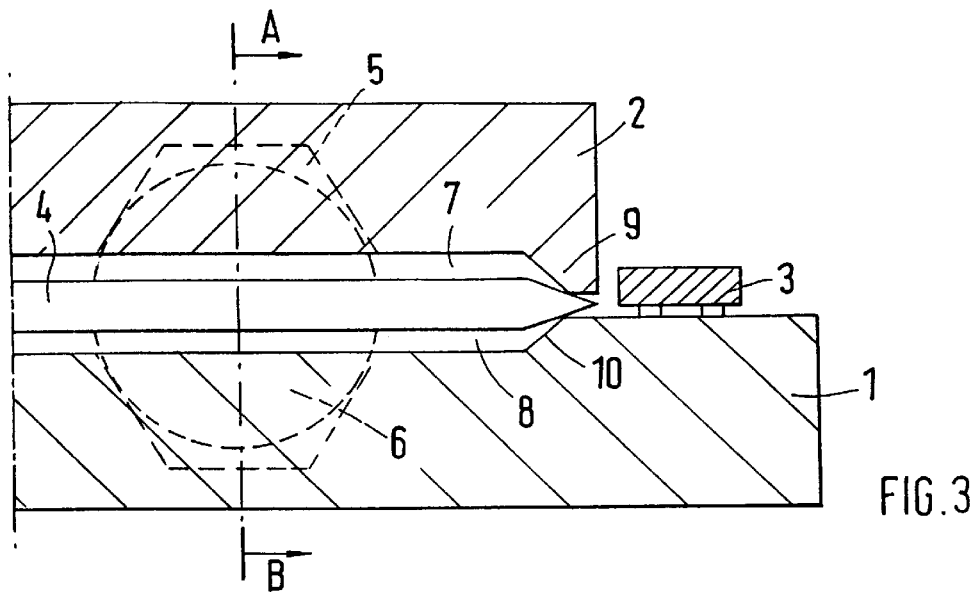
FIG. 3 is an enlarged section of the device according to FIG. 1.

FIG. 1 illustrates a configuration example of a device, according to the present invention, which comprises a plate 1 and a cover 2. A laser array 3 is mounted on the plate 1, to which a plurality of optical waveguides or fibers 4 are to be coupled. As further elaborated below, the optical waveguides 4 are located in corresponding channels with a rhombic cross section, which is formed by two respective V-shaped grooves in plate 1 and cover 2. FIG. 1 also shows conical-frustum-shaped depressions 5 in the plate and the cover, with balls 6 arranged therein, which serve to fit the plate 1 and the cover 2 precisely to each other.

FIG. 2, without the cover 2, depicts how the optical waveguides 4 are placed parallel to each other in the V-shaped grooves of the plate 1, which cannot be recognized, and their pointed ends stop at a defined distance from the laser array 3. This distance corresponds to the focal length of the rounded lens-shaped point of the optical waveguide end.

FIG. 3 illustrates how the axial movement of the optical waveguide 4 is limited by stops 9 and 10. This achieves the desired precise distance of the optical waveguide point 4 from the laser array. The horizontal and vertical position of the optical waveguide 4 is ensured by V-grooves 7 and 8.

Figure 4:
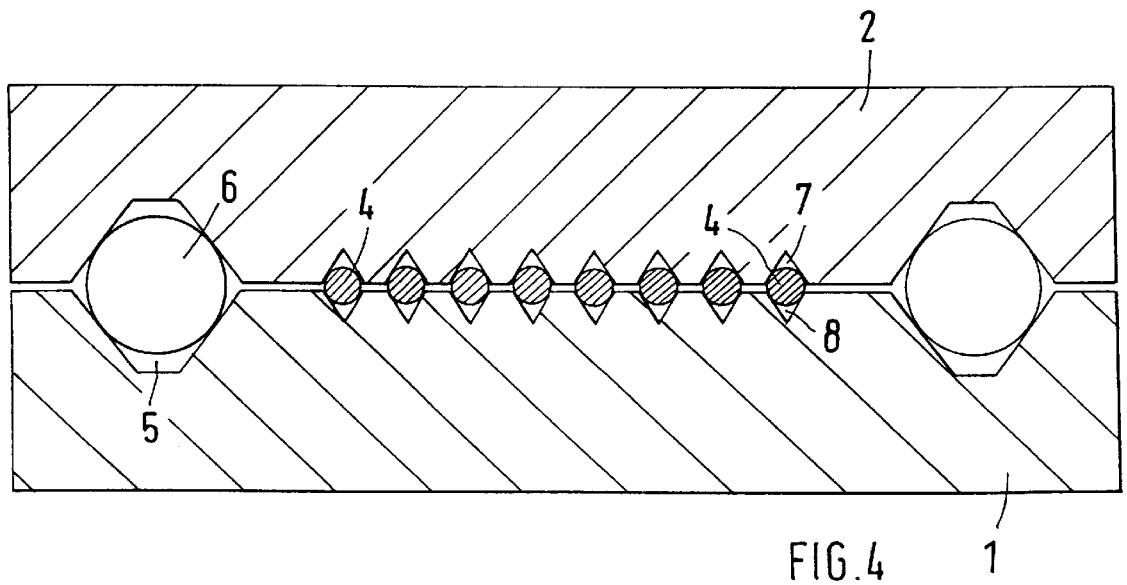
FIG. 4 is a cross section of the device along line A-B in FIG. 3.

FIG. 4 depicts how the V-grooves 7 and 8 form a channel with a rhombic cross section, in which the optical waveguides 4 are arranged in a precise horizontal and vertical position.

In one configuration example, it was proven to be useful to manufacture the plate 1 and the cover 2 from silicon plates, because in this material the V-grooves 7, 8 and the pyramid-frustum-shaped depressions 5 can be produced with the required accuracy and reproducibility by means of anisotropic etching. However, all other materials with which these results can be achieved, can be used. The balls 6 may be made of glass, because balls of this material can be manufactured with a diameter tolerance of ±1 $\mu$m.

The device can be manufactured in such a way, that the plate 1 and the cover 2 are permanently joined to each other after insertion of the balls. Accordingly, the optical waveguides 4 are pushed to the stops 9 and 10 in the channels formed by the V-grooves 7, 8, and are affixed there by introducing an adhesive material from the end of the device into the gussets of the V-grooves 7, 8 that are not filled by the optical waveguide 4.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A device for coupling a plurality of optical fibers to a laser array, comprising:

a flat substrate with a plurality of V-grooves and a laser array, ends of the V-grooves adjacent to the laser array being provided with an oblique stop;

a flat cover with a same plurality of V-grooves as said flat substrate, ends of the V-grooves being provided with an oblique stop, said V-grooves of said substrate and cover being arranged to form rhombic channels after said substrate and cover have been fitted together, the ends of the V-grooves of each rhombic channel forming a pointed end stop for placing an optical fiber with a pointed end at a desired precise distance from the laser array after said substrate and cover have been fitted together; and means for precisely positioning the flat substrate and flat cover relative to each other.

2. A device as claimed in claim 1, wherein said pointed ends are stopped at a selected distance from the laser array, wherein said pointed ends are rounded to form a lens, and wherein said selected distance is a focal length of said lens.

3. A device as claimed in claim 2, wherein the flat substrate and flat cover are made of silicon, and wherein the V-grooves are formed by anisotropic etching.

* * * * *